United States Patent Office 3,284,516
Patented Nov. 8, 1966

3,284,516
REACTION PRODUCTS OF HALOGENATED KETONES WITH UNSATURATED HYDROCARBONS
Horace R. Davis, Roseville, Minn., assignor to Minnesota Mining and Manufacturing Company, St. Paul, Minn., a corporation of Delaware
No Drawing. Filed Jan. 7, 1965, Ser. No. 424,108
7 Claims. (Cl. 260—633)

This application is a continuation-in-part of my copending application Serial Number 173,801, filed February 16, 1962, now abandoned.

This invention relates to new and useful fluorinated unsaturated alcohols, to new and useful fluorinated diols and to methods for making the same.

Certain reactions of fluorinated ketones are known. Thus, Knunyants et al., in Zhur Vsesoyuz. Khim. Obshchestva im. D. I. Mendeleeva, vol. 5, pages 112–3 (1960), describe the reaction of hexafluoroacetone with certain organic compounds which contain oxygenated activating groups, e.g., malonic acid and ester and benzyl malonic acid. British Patent 964,755, based on the U.S. application of M. H. Litt and G. J. Schmitt, S.N. 157,270, filed December 5, 1961, describes the reaction of perhalogenated acetone with α-olefinic compounds having at least 3 carbon atoms in the olefinic chain. Simmons and Wiley, Journal of the American Chemical Society, volume 82, pages 2289 et seq. (1960), describe reactions of bis-(chlorodifluoromethyl)ketone with sodium acetylide and with bisbromomagnesium acetylide which retain the triple bond in the products.

It is an object of this invention to provide multiply-unsaturated fluorinated tertiary alcohols. Another object of the invention is to provide halogen-containing multiply unsaturated ditertiary glycols. A further object of the invention is to provide biocidal agents. Yet other objects will become apparent from the disclosure hereinafter made.

It has been found that these and other objects of the invention are accomplished by reacting acyclic fluorinated ketones with multiply unsaturated materials containing at least one allylic hydrogen atom to produce as final products fluorinated tertiary alcohols. When the resulting fluorinated alcohol contains an allylic hydrogen atom, further reaction with the fluoroketone gives a ditertiary glycol. The tertiary alcohols and glycols of the invention possess valuable biocidal properties.

The fluorinated ketones employed in the process of the invention have the formula:

wherein A and B are the same or different lower alkyl radicals having exclusively halogen atoms of the group of fluorine and chlorine on the α-carbon atoms, at least one of the said halogen atoms being fluorine. Typical of such compounds are perfluoroacetone (i.e., hexafluorodimethyl ketone), perfluoromethyl ethyl ketone, perfluorodibutyl ketone, and the like perfluorinated ketones, and bis(chlorodifluoromethyl)ketone, bis(dichlorofluoromethyl)ketone, trichlorotrifluoroacetone and the like chlorofluoroketones. It is believed that these substances are sufficiently well known in the art to require no further description.

The unsaturated starting materials employed in the reaction are members having a skeletal chain of at least three carbon atoms of the group consisting of

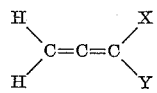

and $$X-C\equiv C-CH_2Z$$

wherein X and Y are individually selected from the group consisting of hydrogen and lower alkyl and Z is a member of the group consisting of hydrogen, chlorine and lower alkyl.

These multiply unsaturated materials are further typified as multiply unsaturated compounds possessing at least one allylic hydrogen and devoid of active hydrogen atoms of other types. By the term allylic hydrogen is meant a hydrogen atom on the carbon atom next to carbon-to-carbon unsaturation and hence includes what is more specifically designated a propargyllic hydrogen atom, that is a hydrogen atom on the atom next to a triple bond. It will be apparent that the allenes may possess a plurality of allylic hydrogen atoms, all of which may not be available for reaction as more specifically illustrated herein below. The triple bond of acetylenes is considered as two unsaturations so that these multiply unsaturated compounds are generically compounds possessing at least one multiply unsaturated single carbon atom, i.e., the intermediate carbon atom of an allene group or one of the carbons of an ethyne group.

Active hydrogen atoms of other types which should generally be avoided are illustrated by the hydrogen atoms in the following groups: primary and secondary hydroxyl, aldehyde, carboxylic, sulfonic, sulfinic and sulfenic acid, and derivatives such as amides, so-called enolizable hydrogens activated by adjacent carbonyl groups, primary and secondary amine groups, hydrazine groups and aliphatic nitro and nitroso groups. Groups which do not interfere, since they possess no active hydrogen, include, for example, halogens, alkylene, aromatic nitro, alkoxy and aryloxy groups. Tertiary hydroxyl groups, as present in final compounds, also do not interfere. Simple ester groups, e.g., acetate and benzoate, may serve to protect primary or secondary hydroxyl groups and render them innocuous.

Illustrative multiply unsaturated materials suitable for use in the process of the invention include methyl acetylene, pentyne-1, hexyne-1, hexyne-3, dodecyne-1, and the like, methyl allene, 1,1-dimethyl allene, butyl allene, and the like and allene.

The process of the invention comprises bringing the selected multiply unsaturated substance and selected fluorinated ketone together in a suitable vessel and reacting the mixture at a temperature in the range of about 20° to 200° C. for a few hours, i.e., for a period of from about 1 to about 20 hours and then isolating the product. No catalyst, diluent or other material is necessary to effect the reaction which proceeds very readily. It will be understood, of course, that not all reactants interact with equal ease. The pressure during the reaction is the autogenous pressure in the vessel and may be up to about 100 atmospheres, but is usually less.

The reaction may take place with one or more moles of fluorinated ketone depending on the structure of the product of the initial reaction and whether or not this product still possesses reactive allylic hydrogen atoms. The initial reaction is distal to any alkyl substituents in the above compounds. The reactions which take place under various conditions of substitution are illustrated by the respective equations:

(I)

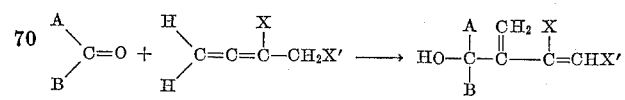

(II)

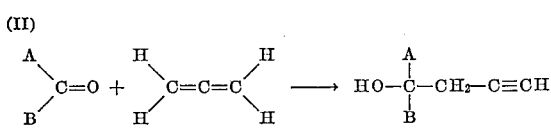

(III)

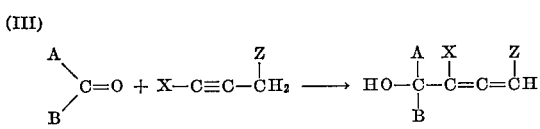

It will be seen that Equation II shows the special case of allen in which X and Y are both hydrogen.

The groups CH₂X′ and CH₂Z are used rather than Y to show the migration of bonds during the course of the reaction. In these groups, X′ is a member of the group consisting of hydrogen and alkyl of 1–6 carbon atoms and Z is a member of the group consisting of hydrogen, chlorine and alkyl of 1–6 carbon atoms. The product of Equation I will be seen to be a 1,3-diene capable of reaction of such special compounds and the product of Equation III is an allene. When these tertiary alcohols still possess an allylic hydrogen (as hereinabove defined) reaction can occur with a second molecule of the same or a different fluorinated ketone (hereinafter designated D–CO–E), wherein D and E have the same definitions as A and B above, to produce a glycol. In general this occurs most readily with the product of Equation II as shown in Equation IV.

(IV)

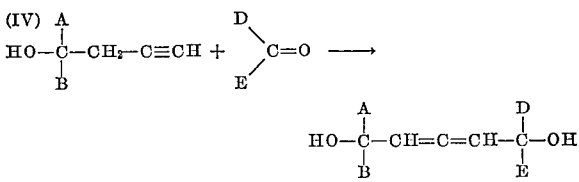

Further reaction when allylic hydrogen atoms are present, as in Equation IV, is apparently hindered by the bulk of the fluorinated groups present.

The product of reaction I above may still contain hydrogen atoms. These either fail to react further or undergo cyclization on reaction with fluorinated ketones. It will be noted that the position of the double bond with respect to the alkyl substituents has shifted in reactions illustrated by Equations I through IV. Such a shift of a double bond is a useful expedient in organic chemistry in degradation studies and for preparative purposes.

The reaction of allene and alkyl allenes as shown above are similar in that there is first a regression of the unsaturation from the point of attachment of the fluorinated residue. Regression may also occur to the Y group or two unsaturations may form one triple bond as seen above.

The allenic alcohols formed in Equations III and IV are of further interest in that the allenic linkage may be a center of asymmetry such that both $d$ and $l$ forms may be obtained and these can be resolved by suitable methods. Thus because one of the hydroxyl groups in the tertiary alcohols and glycols of the invention is usually quite acidic (sufficient to cause solubility in inorganic bases), resolution may be accomplished by means of salts of these compounds with suitable optically active bases.

The tertiary alcohols and diols of the invention are useful as antibacterial agents. For example, these compounds are extremely toxic towards the Gram-positive *Bacillus subtilis* and *Staphylococcus aureus* as well as against the Gram-negative *Escherichia coli*. These compounds are also useful as fungicides. Bactericidal and fungicidal activity varies from compound to compound. The tertiary alcohols and diols in which A, B, D and E as defined hereinabove are identical are the preferred compositions since they are most conveniently made.

It will be seen that among the compounds of the invention are the useful intermediate tertiary alcohols having the structure represented by:

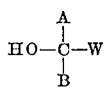

wherein W is a member of the group consisting of the monovalent radicals:

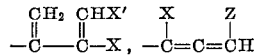

and

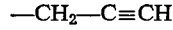

and the useful glycols represented by the formula:

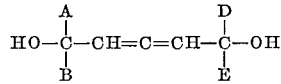

wherein A, B, D, E, X, X′ and Z have the significance set forth hereinabove.

The term "lower alkyl" is to be understood as referring to radicals having from 1 to about 6 carbon atoms wherever the term occurs herein.

Having now generally described the invention it is now more particularly illustrated by examples showing the best mode presently contemplated of practicing the invention in its various aspects. Where not otherwise specified, parts are by weight, temperatures in degrees centigrade and pressures in millimeters of mercury.

EXAMPLE 1

Equimolar amounts of dichlorotetrafluoroacetone and 1,1-dimethyl allene are heated at 140° C. for 18 hours in a stout-walled glass vessel under autogenous pressure. After cooling and opening the vessel, the reaction mixture is first fractionally distilled, and the portion distilling at 70°/7 mm. is further purified by vapor phase chromatography. By this technique a liquid is separated which is shown by infrared and nuclear magnetic resonance spectroscopy to be 1,1-bis(chlorodifluoromethyl)-2-methylene-3-methylbut-2-ene-1-ol.

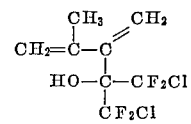

EXAMPLE 2

In a glass vessel of suitable size are placed 15 parts (1.1 moles) of bis(chlorodifluoromethyl)ketone and 7 parts (1 mole) of hexyne-1. The vessel is sealed and heated at 100° C. for 4 hours and then cooled and opened. The contents are fractionated and the colorless liquid allenic tertiary alcohol 1,1-bis(chlorodifluoromethyl) heptane-2,3-dien-1-ol is obtained boiling at about 85° C. at 7 mm. Hg pressure, $n_D^{27}=1.4320$. The alcohol is soluble in organic solvents. Infrared absorption spectroscopy shows sharp bands at 2.85 microns and 5.07 microns corresponding respectively to the hydroxyl group and the allenic double bond system. No bonds are observed corresponding to carbonyl groups or ethylenic or acetylenic unsaturation.

*Analysis.*—Calculated for $C_9H_{10}Cl_2F_4O$: 38.5% C; 3.6% H; 27.0% F. Found: 38.8% C; 3.7% H; 27.3% F.

EXAMPLE 3

1,3-dichlorotetrafluoroacetone and hexyne-3 are heated together in 2:1 molar ratio in a stout-walled vessel for 20 hours at 170° C. After cooling and opening the vessel, the reaction mixture is distilled under reduced pressure. The allenic alcohol 1,1-bis(chlorofluoromethyl)-2-ethyl-penta-2,3-dien-1-ol boils at about 78° C. at 9 mm. Hg pressure.

*Analysis.*—Calculated for $C_9H_{10}Cl_2F_4O$: 38.5% C; 3.6% H; 25.2% Cl. Found: 38.5% C; 3.6% H; 25.5% Cl.

The structure of this alcohol is established by infrared and nuclear magnetic resonance spectroscopy.

EXAMPLE 4

Acetylenic materials react by the procedure described above in mole ratios of about 1 mole of ketone per mole of acetylenic material to yield the tertiary allenic alcohol. The following table shows some further typical reactants and the products obtained.

*Table II*

| Ketone | Acetylene / Mol. ratio | Time (hrs.) / Temp. (° C.) | Product |
| --- | --- | --- | --- |
| $(n\text{-}C_3F_7)_2CO$ | $\dfrac{n\text{-}C_3H_7C\equiv CH}{0.9}$ | $\dfrac{46}{100}$ | $C_2H_5CH=C=C(C_3F_7)_2$<br>$\phantom{C_2H_5CH=C=C}|$<br>$\phantom{C_2H_5CH=C=C}OH$ |
| $(CF_2Cl)_2CO$ | $\dfrac{n\text{-}C_3H_7C\equiv CH}{0.9}$ | $\dfrac{18}{100}$ | $C_2H_5CH=C=CHC(CF_2Cl)_2$<br>$\phantom{C_2H_5CH=C=CHC}|$<br>$\phantom{C_2H_5CH=C=CHC}OH$ |
| $(CF_2Cl)_2CO$ | $\dfrac{CH_3(CH_2)_9C\equiv CH}{1.0}$ | $\dfrac{20}{100}$ | $CH_3(CH_2)_8CH=C=CHC-OH$<br>$\phantom{CH_3(CH_2)_8CH=C=CHC-}|$<br>$\phantom{CH_3(CH_2)_8CH=C=CHC-}(CF_2Cl)_2$ |
| $(CF_2Cl)_2CO$ | $\dfrac{CH_3C\equiv CH}{0.5}$ | $\dfrac{18}{100}$ | $\phantom{CH_2=C=CH}OH$<br>$\phantom{CH_2=C=CH}|$<br>$CH_2=C=CHC(CF_2Cl)_2$ |
| $(CF_2Cl)_2CO$ | $\dfrac{CH_2ClC\equiv CH}{0.5}$ | $\dfrac{18}{140}$ | $\phantom{CHCl=C=CH}OH$<br>$\phantom{CHCl=C=CH}|$<br>$CHCl=C=CHC(CF_2Cl)_2$ |
| $(CF_3)_2CO$ | $\dfrac{CH_3C\equiv CH}{1.0}$ | $\dfrac{2}{50}$ | $\phantom{CH_2=C=CH}OH$<br>$\phantom{CH_2=C=CH}|$<br>$CH_2=C=CHC(CF_3)_2$ |

EXAMPLE 5

The procedure of Example 1 is repeated employing 53 parts of dichlorotetrafluoroacetone and 17 parts of allene (approximately 1:2 molar ratio), heating for 46 hours at 160° C. Fractional distillation of the reaction mixture provides the 1:1 reaction product, 1,1-bis(chlorodifluoromethyl)-but-3-yn-1-ol boiling at 58° to 60° at 18 mm. Hg pressure, $n_D^{20}=1.408$.

*Analysis.*—Calculated for $C_6H_4Cl_2F_4O$: 30.1% C; 31.8% F. Found: 30.3% C; 31.7% F.

The procedure is repeated employing 41.3 parts of dichlorotetrafluoroacetone with 2.1 parts of allene (approximately 2:1 molar ratio) heating for 18 hours at 160° C. The greater part of the reaction product distills at 76° to 80° C. at 0.2 mm. Hg pressure. It is recrystallized from hexane and is found to be 1,1,5,5-tetrakis(chlorodifluoromethyl)penta-2,3-dien-1,5-diol melting at 76° to 78° C. This compound is found to possess significant activity against various lower plants and animals and also retards the germination of seeds of barley, flax, radishes and tomatoes.

What is claimed is:
1. A compound of the formula

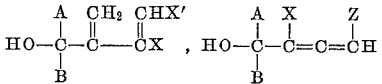

wherein A, B, D and E are each a lower alkyl radical having exclusively halogen atoms of the groups of fluorine chlorine on the α-carbon atoms, at least one of the said halogen atoms being fluorine.

2. A compound selected from the group consisting of

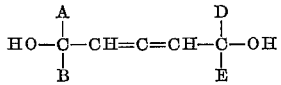

and $$\begin{array}{c} A \\ | \\ HO-C-CH_2-C\equiv CH \\ | \\ B \end{array}$$

wherein A and B are each a lower alkyl radical having exclusively halogen atoms of the group of fluorine and chlorine on the α-carbon atoms, at least one of the said halogen atoms being fluorine, X, and X' are independently selected from the group consisting of hydrogen and lower alkyl and Z is a member of the group consisting of hydrogen, chlorine and lower alkyl.

3. 1,1-bis(chlorodifluoromethyl)-2-methylene-3-methylbut-3-ene-1-ol.

4. 1,1-bis(chlorodifluoromethyl)heptane-2,3-dien-1-ol.

5. 1,1-bis(chlorodifluoromethyl)-2-ethylpenta-2,3-dien-1-ol.

6. 1,1-bis(chlorodifluoromethyl)-but-3-yn-1-ol.

7. 1,1,5,5-tetrakis(chlorodifluoromethyl)penta-2,3-dien-1,5-diol.

References Cited by the Examiner

FOREIGN PATENTS 3,140,298  7/1964  England.

OTHER REFERENCES

Knunyants et al., "Chem. Abstr." 54 (1960), p. 20872.

LEON ZITVER, *Primary Examiner.*

J. E. EVANS, *Assistant Examiner.*